April 24, 1934.     F. G. HUGHES     1,956,236
BEARING
Filed Oct. 13, 1930     3 Sheets-Sheet 1

INVENTOR:
FREDERICK G. HUGHES,

BY
Gales P. Moore
HIS ATTORNEY.

April 24, 1934.  F. G. HUGHES  1,956,236
BEARING
Filed Oct. 13, 1930  3 Sheets-Sheet 2

INVENTOR:
FREDERICK G. HUGHES,

BY
*Gales P. Moore*
HIS ATTORNEY.

April 24, 1934. F. G. HUGHES 1,956,236
BEARING
Filed Oct. 13, 1930 3 Sheets-Sheet 3

INVENTOR:
FREDERICK G. HUGHES,

BY Gales P. Moore
HIS ATTORNEY.

Patented Apr. 24, 1934

1,956,236

UNITED STATES PATENT OFFICE 1,956,236

BEARING

Frederick G. Hughes, Bristol, Conn., assignor, by mesne assignments, to General Motors Corporation, Detroit, Mich., a corporation of Delaware Application October 13, 1930, Serial No. 488,303

17 Claims. (Cl. 308—189).

Figure 1:
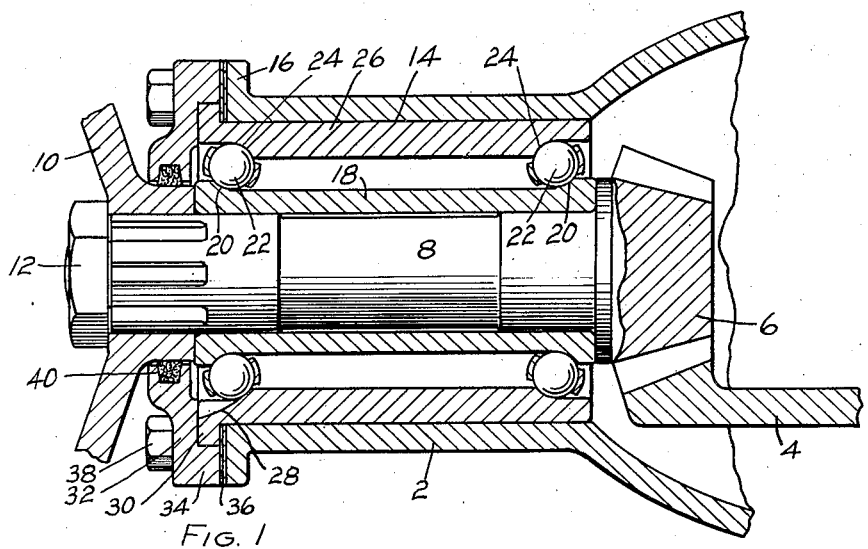

This invention relates to bearings, and comprises all the features of novelty herein disclosed, the present application being a continuation-in-part of my application Serial Number 326,040, filed December 14, 1928. An object of the invention is to provide a simple and inexpensive bearing that under the extraneous loads for which it is rated will firmly maintain its supported parts against misalignment and chatter. To this end and to improve generally and in detail upon devices of this character, the invention consists in the various matters herein disclosed and claimed. In its broader aspects, the invention is not necessarily limited to the specific constructions selected for illustrative purposes in the accompanying drawings, in which Figure 1 is a horizontal sectional view of the present bearing shown in one of the ways in which it can be mounted, and Figs. 2, 3, 4, and 5 are similar views of other embodiments or mountings of the invention.

Figure 3:
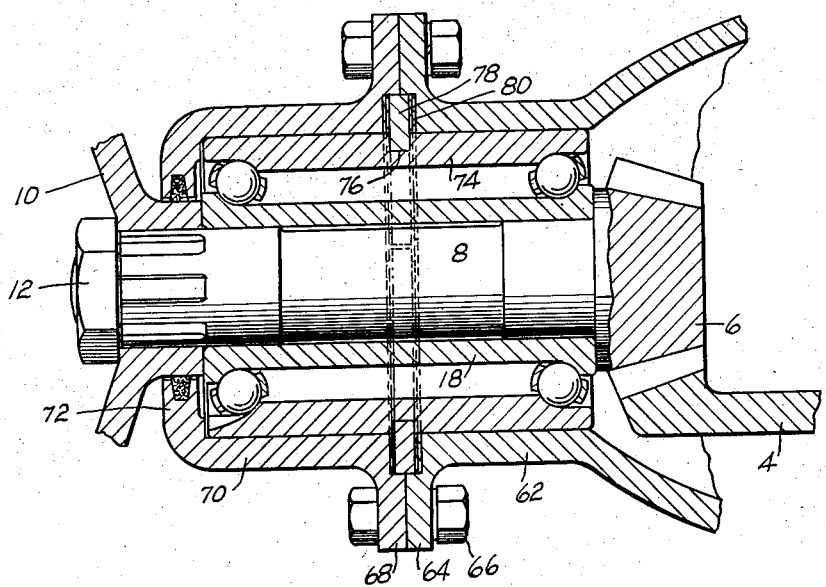
Figure 4:
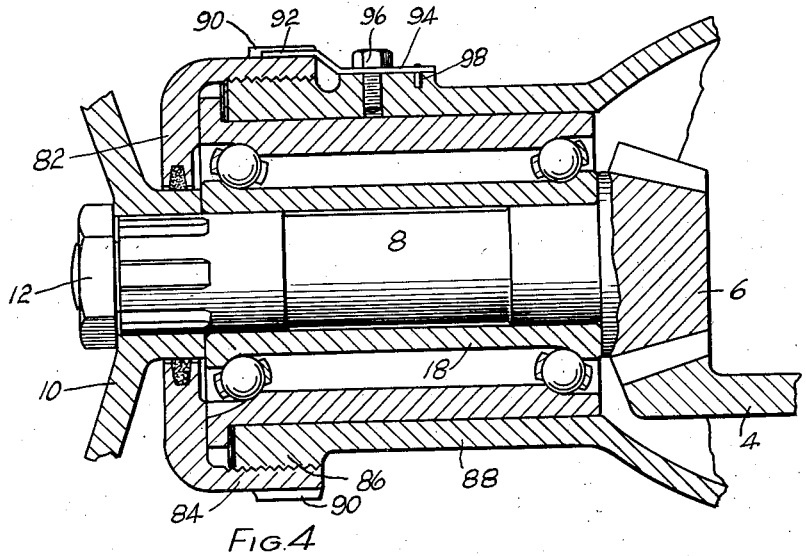
Figure 5:
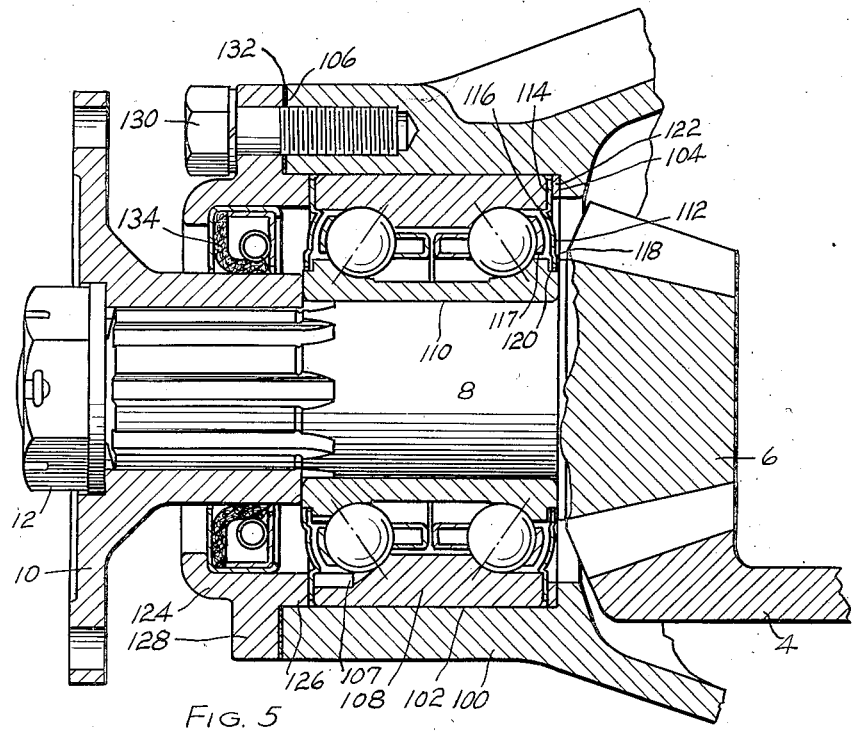

In the illustrated embodiments the inner race-ring or cone-member, marked 18 in Figures 1–4 and 110 in Figure 5, is an integral cylindrical sleeve, preferably elongated, provided at each of its ends with an inwardly-facing, angularly-set raceway 20, and the outer race-ring or cup-member 26 (and 108) is a corresponding integral sleeve, preferably externally-cylindrical, provided at each end with an outwardly-facing, angularly set raceway 24 that cooperates with the corresponding raceway of the inner race-ring, this cup-sleeve being preferably provided at one end with a filling slot 28 (and 107) to permit insertion of below-mentioned balls. Between each set of these cooperating raceways is a row of rolling elements, shown as balls 22, making angular contact therewith, the contact-lines approaching each other as they proceed away from the cone-member. The balls have normal diameters larger than the space between cooperating raceways of a set, with the result that in the assembling of the bearing the balls are compressed between those raceways and a predetermined, internal, initial load is thereby placed upon them so that when the bearing, or its supported part (as, for example, a pinion shaft 8) is placed under the extraneous load for which the bearing is rated and intended the balls will remain in firm contact with their races and thereby the bearing elements (and their supported parts) will be maintained in rigid alignment and prevented from chattering and wabbling.

The balls being thus held under initial compression even when the bearing is free from extraneous load, it follows that not only does the compressed material most effectively resist any axial or radial displacement between the bearing elements but also should the load be great enough to cause further compression upon a given side of the bearing (either axially or radially) and consequent slight further separation, at the other side of the bearing, between cooperating races of a set, the balls at that other side expand in their natural effort to regain their normal, unloaded diameters and thus maintain their firm contact with their races with continued steadying pressure so that there is stable support between the race-rings and their balls under all normal, expected extraneous loads, whether axial, radial, or both. Usually such initial loading to an amount ranging from about five percent to about fifteen percent of the rated thrust-sustaining capacity of the bearing at normal operating speed is sufficient to hold the parts with the above mentioned firmness, although when the bearing is to be used for some purposes (as, for example, upon a shaft of a lathe center) even higher initial loads are applied.

The above-described constant firm engagement of the two, spaced rows of balls with their integral race-rings gives the bearing great capacity for firmly holding the parts between which it is placed, and this firmness is augmented by the above-mentioned angular contact of the rows of balls in the lines that approach each other as they proceed away from the cone-ring, because this enables the bearing to most successfully resist tilting pressures. By this relationship of the contact-lines the contact points are spaced to give broad support on the cone, and, also, should some load come upon the right-hand end of the cone-sleeve 18, or 110, in a direction upwardly and toward the left as the parts are shown, the tendency would be for the left-hand end of that sleeve to tilt downward and toward the right, swinging upon the upper right-hand ball as a pivot; but the lower, left-hand race portion of the cup-ring, curving upwardly and inwardly, extends squarely across and solidly opposes any such movement of the initially-compressed, lower left-hand balls.

Also, the fact that the contact between the balls and their races is angular, rather than radial, facilitates the introduction of the "over-size" balls previously referred to, because it enables the inner end of the filling slot, as 28, to join the race-groove at a point further inwardly, and thus more removed from the coacting race-ring, than would be the case were the ball-contact radial. This gives convenient space for introducing the balls and snapping them into the race-groove and also gives space (on the race-groove) for the compressed balls to make their engagement with the race-groove entirely inside of the point at which the filling-slot joins that groove, with the result that, notwithstanding the unusually relatively large ball-diameter and the compression to which the balls are subjected, not only can the balls be conveniently snapped into their race-groove but also when in that groove they do not contact with any edge of the filling-slot even during rotation of the bearing under its extraneous load. Furthermore, the employment of two sets of angularly-disposed races, especially when each race-ring is an integral part containing two race-grooves, presents between those grooves a large mass of material (of the race-ring) to absorb and resist the pressure exerted by the compressed balls in an angular direction, so that danger is avoided of having the outward pressure of each ball itself spreading the race-ring at the place of ball-contact and thus destroying the circularity of the ball-race.

My present bearing has many advantageous applications, because its firmness enables it to perform the work that has commonly heretofore required two or more bearings. Thus, its use saves expense and economizes in space and in mounting instrumentalities. One very advantageous use of the present bearing is upon the pinion shaft of the differential mechanism of an automobile drive, and I have here shown examples of that use, 8 indicating the pinion shaft, 6 its overhanging bevelled pinion, and 4 the meshing bevelled ring-gear. The bearing is shown placed immediately between the shaft 8 and its forwardly extending tubular carrier (marked 2 in Figure 1 and 42, 62, 88, and 100, respectively, in the other figures) and also between the pinion 6 and the driver or coupling-disc 10 that is keyed to the shaft and held clamped upon it by the nut 12. In all figures except 2 that carrier extends as part of the usual housing of the rear axle. In Figure 1 the cup-sleeve 26 has at one end an outwardly-extending flange 30 that is clamped by the bolts 38 between the housing flange 16 and the end cap or clamping ring 32, shims 36 of selected aggregate thickness, and preferably split radially, being placed between the flange 34 of that ring and the flange 16 in order to properly space the pinion in its adjusted engagement with the ring-gear. A washer 40 of felt or the like is provided between the cap 32 and the hub of the coupling disc 10, and, as the firmness of the bearing prevents pounding of that hub against the washer, the life of the washer is prolonged and less expensive material is required to give it proper strength and resiliency.

Figure 2:
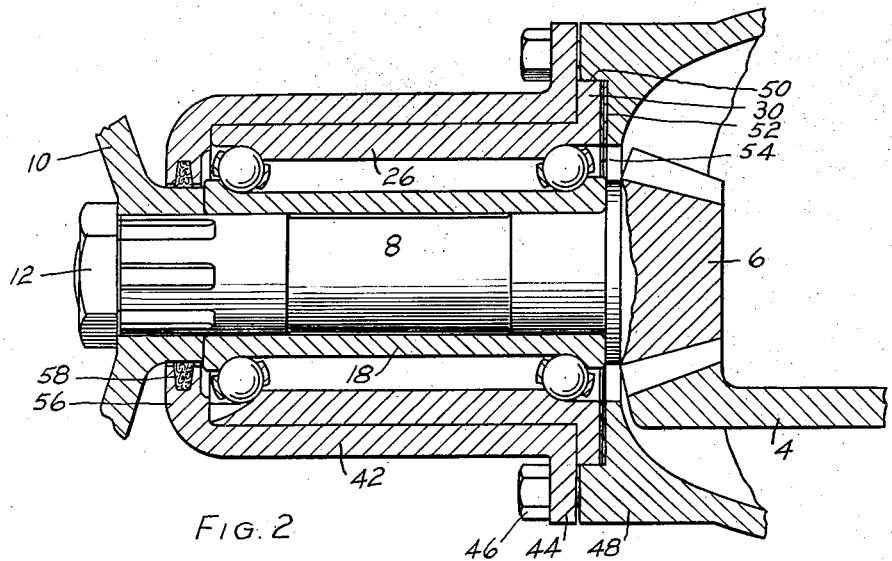

In Figure 2 the carrier 42 is shown as a cup having bolts 46 connecting its flange 44 to the portion 48 of the axle-housing in whose recess 50 the flange 30 of the bearing is received against the spacing-shims 52, while the sealing washer is indicated at 58.

Figure 3 shows a shorter carrier, 62, than does Figure 1, but this is supplemented by the extension carrier or cap 70 with its end flange 72, and the meeting flanges 64 and 68 upon these parts are clamped together by the bolts 66 and, in mating recesses, hold between them a locating flange in the form of a two-piece ring 78 received in an annular recess 76 in the periphery of the cup-sleeve 74, the shims 80 upon appropriate sides of the ring 78 locating the bearing.

In Figure 4 the end cap or clamping ring 82 is provided with a threaded flange 84 engaging a threaded boss or flange 86 on the carrier 88. The flange 84 has a multiplicity of lugs 90 forming notches, one of which is engaged by a locking finger 92 on a plate 94 secured to the carrier 88 by a screw 96 and pin 98.

In Fig. 5, the bearing and the axle housing or carrier 100 are shown shortened and the carrier is provided with a cylindrical bore 102. The bore terminates at one end in a flange having an abutment face 104 and terminates at the other end in a flange or thickened part having an end face 106. The bearing and pinion are located accurately by one or more spacing plates 122 interposed between the end of the outer race ring (or the rim 114 of its below-mentioned shield) and the face 104. The bearing is clamped in position by a cap 124 having an axial flange 126 entering the bore 102 and engaging the forward end of the outer race ring or its shield. The cap also has a flange 128 secured by clamping bolts 130 to the axle casing, a yieldable gasket 132 preferably being interposed. The cap also carries a suitable seal 134 to engage the member 10. The spacing plate or plates 122 are ground to the requisite thickness to insure efficient meshing of the pinion with the gear.

As shown in this Figure 5, I sometimes seal the bearing itself to not only retain the lubricant but also prevent ingress or grit or other extraneous matter, thereby insuring the smooth running of the bearing and avoiding the wearing away of the parts (and thus the loss of the initial load) by such gritty extraneous material. As shown in that figure the outer race ring 108 is of slightly less length than the inner race ring 110. Each end of the bearing is shielded or sealed by a washer comprising a body portion 112 connected to a peripheral portion or rim 114 by a bent-in projection or bead 116 which is yieldable to frictionally engage the inner surface of the outer race ring. The body portion is dished to clear the adjacent separator 117 and terminates in an outwardly cupped portion 118 whose inner periphery extends down into a notch 120 in the inner race ring where it has a close running clearance. The washer is snapped into holding engagement with the bearing and not only holds lubricant but prevents entry of grit which could so abrade the balls and their raceways as to diminish or remove the internal load. This provides a unit-handling, sealed-up, preloaded, double-row bearing.

Thus, my present device affords an inexpensive, initially-loaded, unit-handling bearing that can be properly assembled at its factory and cannot thereafter be tampered with in such way as to disturb the initial, effective relationship of its parts; and this single bearing can be used to perform the work that has heretofore required two bearings (as the double-row and single-row bearings commonly employed together upon the pinion-shafts of automobile differential drives), the elimination of the necessity for such second bearing also eliminating the necessity for the previously-required adjusting-casing for it and thus making available maximum diameter of bearing for a given space (so that maximum strength of balls is possible), and the initially compressed balls strongly resist any normal extraneous load and expand to firmly compensate for any displacement due to such load, so that the desired adjustment and alignment of supported parts are rigidly maintained during operation.

I claim:

1. In a unit-handling, sealed-up, preloaded, double-row bearing, a one-piece outer race ring having a pair of angular contact raceways, a one-piece inner race ring having a cooperating pair of angular contact raceways, two rows of rolling elements in the raceways, the rolling elements being larger than the space between opposed raceways to apply a predetermined initial load, and sealing washers carried by one of the race rings and having a close running fit with the other race ring to exclude grit and thereby maintain the initial load of the bearing; substantially as described.

2. A bearing having race-members and interposed metallic rolling-elements of greater normal diameter than the normal distance between their cooperating races; substantially as described.

3. A double-row bearing comprising race-members, and metallic rolling-elements therebetween of greater normal diameter than the normal distance between co-operating races of a set; substantially as described.

4. A double-row bearing comprising race-members, and rolling-elements therebetween and contacting therewith in lines which approach each other as they proceed away from the axis of rotation of said bearing, said rolling-elements being of normal diameter so much greater than the normal distance between their cooperating races that said rolling-elements and races are in compressed relation when free from load extraneous to the bearing itself and remain in engagement with each other when the bearing is subjected to normal extraneous load; substantially as described.

5. A double-row bearing comprising an integral cup-member having two races, an integral cone-member having two races, and rolling-elements between said races and of greater normal diameter than the normal distance between races; substantially as described.

6. A double-row bearing comprising an integral cup-member having two races, an integral cone-member having two races, and rolling-elements between respective sets of said races and contacting therewith in angularly-opposed lines, said rolling-elements being of greater normal diameter than the normal distance between said races; substantially as described.

7. A double-row bearing comprising an integral cup-member having two races, an integral cone-member having two races, and rolling-elements between the respective sets of said races and contacting therewith in lines that approach each other as they proceed away from the axis of rotation of said bearing, said rolling-elements being of greater normal diameter than the normal distance between said races; substantially as described.

8. A double-row bearing comprising an integral cup-member having two races, an integral cone-member having two races, and balls between the respective sets of said races and contacting therewith in lines that approach each other as they proceed away from the axis of rotation of said bearing, said balls being of greater normal diameter than the normal distance between said races; substantially as described.

9. A double-row bearing comprising an integral cup-member having two opposed, outwardly-facing, angularly-set races, an integral cone-member having two opposed, inwardly-facing, angularly-set races that respectively co-operate with the respective said cup-races, and balls between each set of said races, the lines in which the balls of the respective sets engage their races approaching each other as they proceed away from the axis of rotation of the bearing, and the normal diameter of the balls being so much greater than the normal distance between their cooperating races that engagement between balls and races remain intact when the bearing is subjected to normal extraneous load; substantially as described.

10. A bearing comprising co-operating race-members one of which has a filling-slot, and a set of rolling-elements in angular contact with said race-members and of normal diameter greater than the normal distance between said race-members in the line of aforesaid contact; substantially as described.

11. A double-row bearing comprising co-operating race-members each of which has two races, and a set of rolling-elements contacting angularly between each set of said races and of normal diameter greater than the normal distance between co-operating said races in the line of the aforesaid contact; substantially as described.

12. A double-row bearing comprising co-operating race-members each of which has two races, and a set of rolling-elements contacting angularly between each set of said races and of normal diameter so much greater than the normal distance between co-operating said races in the line of the aforesaid contact that said rolling-elements and races are in compressed relation when free from load extraneous to the bearing itself and remain in engagement with each other when the bearing is subjected to normal extraneous load; substantially as described.

13. A double-row bearing comprising co-operating race-members each of which is an integral part and has two races, and a set of rolling-elements contacting angularly between each set of said races and of normal diameter greater than the normal distance between co-operating said races in the line of the aforesaid contact; substantially as described.

14. A double-row bearing comprising co-operating race-members each of which is an integral part and has two races, and a set of rolling-elements contacting angularly between each set of said races and of normal diameter so much greater than the normal distance between co-operating said races in the line of the aforesaid contact that engagement between the rolling-elements and races remains intact when the bearing is subjected to normal extraneous load; substantially as described.

15. A double-row bearing comprising an integral cup-member having two races, an integral cone-member having two races, and rolling-elements between the respective sets of said races and contacting therewith in lines that approach each other as they proceed away from the axis of rotation of said bearing, said rolling-elements being of normal diameter so much greater than the normal distance between co-operating said races in the line of the aforesaid contact that engagement between the rolling-elements and races remains intact when the bearing is subjected to normal extraneous load; substantially as described.

16. A double-row bearing comprising race-members, and rolling-elements therebetween and contacting therewith in angularly-opposed lines, said rolling-elements being of greater normal diameter than the normal distance between co-operating races of a set; substantially as described.

17. A double-row bearing comprising race-members, and rolling-elements therebetween and contacting therewith in lines that approach each other as they proceed away from the axis of rotation of the bearing, said rolling-elements being of greater normal diameter than the normal distance between co-operating races of a set; substantially as described.

FREDERICK G. HUGHES.